United States Patent
Kruglick

(10) Patent No.: US 9,204,362 B2
(45) Date of Patent: Dec. 1, 2015

(54) WIRELESS COMMUNICATION NETWORKS INCLUDING MAINS-CONNECTED RELAY NODES

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 158 days.

(21) Appl. No.: 13/816,178

(22) PCT Filed: Nov. 3, 2010

(86) PCT No.: PCT/US2010/055312
§ 371 (c)(1),
(2), (4) Date: Feb. 8, 2013

(87) PCT Pub. No.: WO2012/060829
PCT Pub. Date: May 10, 2012

(65) Prior Publication Data
US 2013/0137441 A1    May 30, 2013

(51) Int. Cl.
| H04B 7/185 | (2006.01) |
| H04W 40/24 | (2009.01) |
| H04B 7/155 | (2006.01) |
| H04W 40/22 | (2009.01) |
| H04W 40/28 | (2009.01) |
| H04W 84/04 | (2009.01) |

(52) U.S. Cl.
CPC ............ *H04W 40/246* (2013.01); *H04B 7/155* (2013.01); *H04W 40/22* (2013.01); *H04W 40/28* (2013.01); *H04W 84/047* (2013.01)

(58) Field of Classification Search
CPC ...... H04B 7/155; H04B 7/14; H04B 7/15542; H04B 17/40; H04W 40/246; H04W 84/047; H04W 40/22; H04W 48/18; H04W 84/18; H04W 88/08; H04W 40/02; H04W 40/10; H04W 92/18; H04W 88/04; H04W 40/12; H04W 24/02; H04W 28/00; H04W 40/00; H04W 40/20; H04W 84/042; H04L 45/28; H04L 45/22; H04L 45/00; H04L 41/12; H04L 45/123; H04L 7/2606; H04L 2001/0097; H04L 47/14
USPC ........... 455/445, 561, 7, 9, 11.1, 13.1, 15, 16, 455/41.2, 450, 572, 515, 343.1, 343.6, 455/405–409, 8; 370/315, 492, 432, 252, 370/253, 311, 338, 328, 351
See application file for complete search history.

(56) References Cited

U.S. PATENT DOCUMENTS

| 6,904,275 | B2 * | 6/2005 | Stanforth | .................... 455/343.1 |
| 7,224,936 | B2 | 5/2007 | Pearson | |
| 7,734,250 | B2 | 6/2010 | Sommer | |
| 8,213,350 | B2 * | 7/2012 | Courseille | .................... 370/315 |

(Continued)

OTHER PUBLICATIONS

Steiner, C., Vending's high-tech frontier cantaloupe system brings order to vending's chaos, Forbes Magazine, Dec. 14, 2009, accessed online on Aug. 21, 2012 via http://www.forbes.com/forbes/2009/1214/entrepreneurs-cantaloupe-systems-vending-snack-attack.html, USA.

(Continued)

*Primary Examiner* — Olumide T Ajibade Akonai
(74) *Attorney, Agent, or Firm* — Brundidge & Stanger, P.C.

(57) ABSTRACT

Implementations and techniques for routing communications in wireless communication networks via mains-connected relay nodes are generally disclosed.

19 Claims, 5 Drawing Sheets

(56) References Cited

U.S. PATENT DOCUMENTS

| | | | | |
|---|---|---|---|---|
| 8,391,202 | B2* | 3/2013 | Courseille | 370/316 |
| 8,503,350 | B2* | 8/2013 | Park | 370/315 |
| 2003/0074106 | A1* | 4/2003 | Butler | 700/236 |
| 2004/0095891 | A1 | 5/2004 | Nakagawa | |
| 2006/0219517 | A1* | 10/2006 | Cheng et al. | 194/217 |
| 2013/0084795 | A1* | 4/2013 | Van Phan et al. | 455/15 |

OTHER PUBLICATIONS

Weng, C.C. et al., A bandwidth-based power-aware routing protocol with low route discovery overhead in mobile ad hoc networks, The Computer Journal (2009).

Vassileva, N. et al, A survey of routing protocols for energy constrained ad hoc wireless networks proc, FGCN 2007, Dec. 6-8, 2007, pp. 521-526, Conference Publications, Jeju-island, Korea.

Yu, C. et al, Energy efficient routing protocols for mobile ad hoc networks. Wireless Commununications and Mobile Computing, 2003, pp. 959-973, vol. 3, USA.

Cavalcanti et al, Connectivity opportunity selection in heterogeneous wireless multi-hop networks, Journal entry in Pervasive and Mobile Computing, Jun., 2008, pp. 390-420, vol. 4, issue No. 3, The Netherlands.

Li, C. et al, A relaying incentive scheme in multihop cellular networks based on coalitional game with externalities, Cornell University Library, Dec. 3, 2008, pp. 1-21, USA.

Australia International Searching Authority, International search report and written opinion of the International Searching Authority for PCT/US2010/055312, mailed on Jan. 13, 2011.

* cited by examiner

400 A computer program product.

402 A signal bearing medium.

404 Machine-readable instructions, which, if executed by one or more processors, operatively enable a computing device to:
    determine which nodes in the wireless communication network qualify as mains-connected relay nodes,
    send a request for connectivity information to the determined mains-connected relay nodes based at least in part on the determination of which nodes qualify as mains-connected relay nodes,
    receive the connectivity information from the determined mains-connected relay nodes, and/or
    route a communication from the source node to a destination node via one or more of the determined mains-connected relay nodes based at least in part on the connectivity information from the determined mains-connected relay nodes.

| 406 a computer-readable medium. | 408 a recordable medium. | 410 a communications medium. |

FIG. 4

WIRELESS COMMUNICATION NETWORKS INCLUDING MAINS-CONNECTED RELAY NODES

CROSS-REFERENCE TO RELATED APPLICATION

The present application is a U.S. National Stage filing under 35 U.S.C. §371 of International Application No. PCT/US10/55312, filed on Nov. 3, 2010.

BACKGROUND

The vending market may be considered to be large. Increasingly, vending machines are being connected by various means. For example, cellular data links may be installed in vending machines by such companies as Cantaloupe Systems, Crane Merchandising Systems, and Mars Electronics to mention but a few. A vending machine cellular data link may monitor a variety of activity such as vending machine usage, openings, sales, and may facilitate needs-based restocking trips that may reduce overhead. It is expected that these connected type of systems will increase greatly over the coming years.

SUMMARY

This disclosure is drawn, inter alia, to methods, apparatus, and systems related to routing communications in wireless communication networks via mains-connected relay nodes.

Some examples may be implemented in a base station of a wireless communication network. A determination may be made as to which nodes in the wireless communication network qualify as mains-connected relay nodes. A request for connectivity information may be sent to the determined mains-connected relay nodes based at least in part on the determination of which nodes qualify as mains-connected relay nodes. The connectivity information may be received from the determined mains-connected relay nodes. Communication may be routed from a source node to a destination node via one or more of the determined mains-connected relay nodes based at least in part on the connectivity information from the determined mains-connected relay nodes.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 4 is an illustration of an example computer program product that is arranged in accordance with at least some embodiments of the present disclosure.

DETAILED DESCRIPTION

Figure 1:
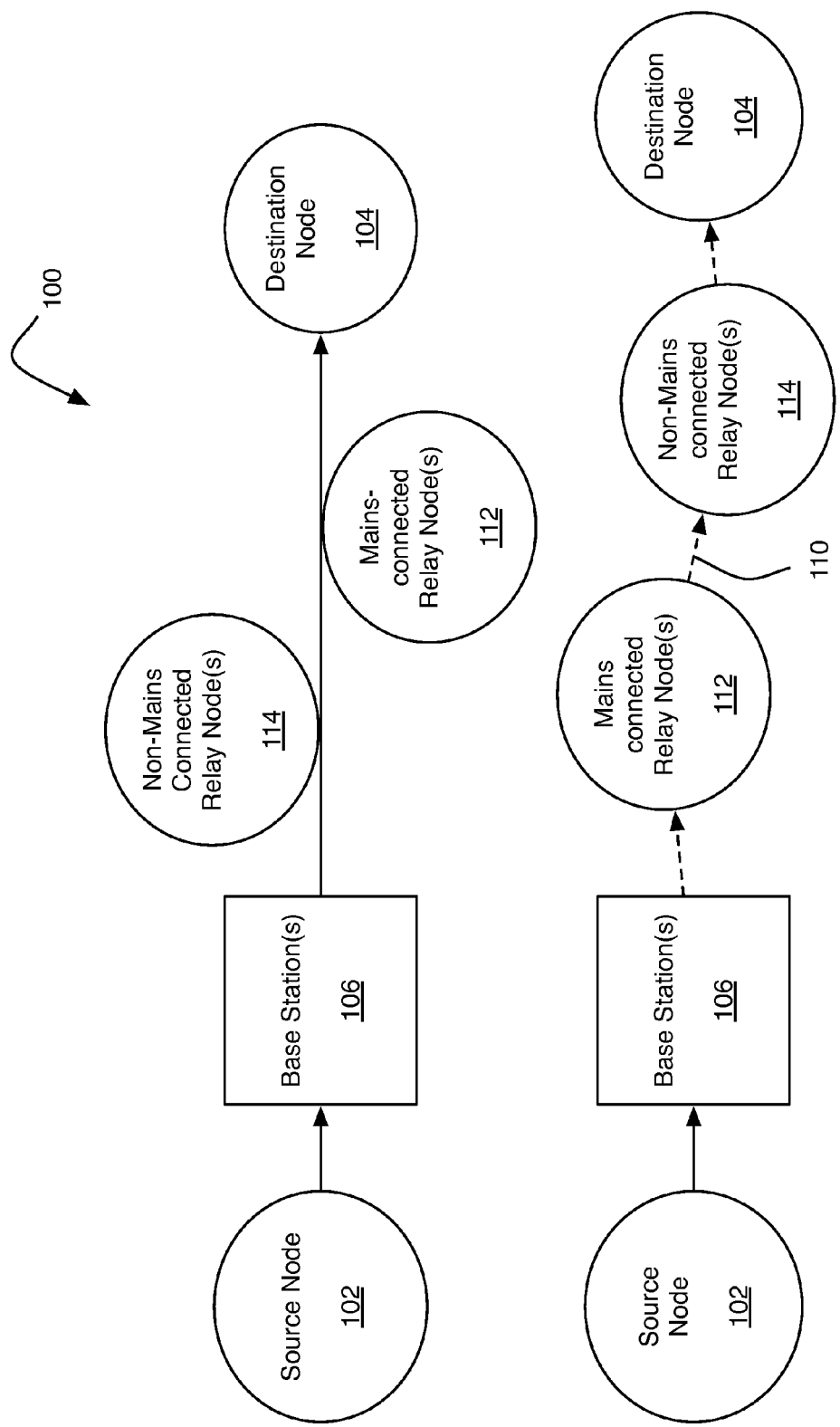
FIG. 1 illustrates a diagram of an example wireless communication network that is arranged in accordance with at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to routing communications in wireless communication networks via mains-connected relay nodes.

The vending market may be considered to be large. Increasingly, vending machines are being connected by various means. For example, cellular data links may be installed in vending machines by such companies as Cantaloupe Systems, Crane Merchandising Systems, and Mars Electronics to mention but a few. A vending machine cellular data link may monitor a variety of activity such as vending machine usage, openings, sales, and may facilitate needs-based restocking trips that may reduce overhead. It is expected that these connected type of systems will increase greatly over the coming years.

As will be described in greater detail below, wireless communication networks may be adapted to leverage such cellular points supplied with mains-connected power (e.g., vending machines devices and other network connected appliances), to improve relay and equalization procedures. For example, such cellular points with mains-connected power may be utilized as preferential relay participants. Such relaying may be utilized to route communications from node to node of the wireless communication network to even out data flows. For example, in such relays a base station may use a strong link between intermediate relay nodes to route communications indirectly to a destination node. It may be possible in these situations for two links associated with intermediate relay nodes to result in a stronger multistep connection than a possible direct link between the base station and the destination node. For example, if the relay nodes are well chosen this can result in lower overall system power use and higher overall bandwidth.

FIG. 1 illustrates a diagram of an example wireless communication network 100 that may be arranged in accordance with at least some embodiments of the present disclosure. As used herein the term "wireless communication network" may refer to any number of communication systems including a plurality of nodes adapted for wireless communication with one another. For example, such a wireless communication network 100 may refer to any number of communication systems including a mesh-type network, an ad hoc-type network, the like and/or combinations thereof that may or may not include dedicated infrastructure.

Wireless communication network 100 may include one or more source nodes 102. Source nodes 102 may be arranged (e.g., coupled) in communication with individual destination nodes 104. Such source nodes 102 and/or destination nodes 104 may include portable (or mobile) electronic device such as a cell phone, a personal data assistant (PDA), a personal media player device, a wireless web-watch device, a personal headset device, an application specific device, and/or the like, and/or combinations thereof. Additionally or alternatively, source nodes 102 may be arranged (e.g., coupled) in communication with base station 106 at least in part via a wired communications network (e.g., as might be the case where source node 102 is relatively distant from base station 106).

Such communication between pairs of source nodes 102 and destination nodes 104 may be facilitated by base station 106. As used herein the term "base station" may refer to an infrastructure node of a wireless communication system, such as a cell tower or the like, that may be associated with a central management center and/or that may include its own local management authority. For example, such a base station may include radio-over-fiber implementations where the base station 106 may include a pole that operates as a receiver/transmitter and where computation may be done remote from the pole at a central management center. In some examples, as illustrated by arrow path 108, communication between pairs of source nodes 102 and destination nodes 104 may be facilitated by one of base stations 106 communicating directly with destination node 104.

In other examples, illustrated by dotted path 110, such communication between pairs of source nodes 102 and destination nodes 104 may include relaying communications directly from one node to another node. For example, such communication between pairs of source nodes 102 and destination nodes 104 may be facilitated by one or more mains-connected relay nodes 112 and/or one or more non-mains-connected relay nodes 114. As used herein the term "mains-connected" may refer to any device connected to a power source other than battery, and may include cellular data link-type vending machines, wireless modems, wireless set top boxes, charging electronic devices (e.g., as a cell phone, a personal data assistant (PDA), a personal media player device, a wireless web-watch device, a personal headset device, an application specific device, etc.), the like, or combinations thereof. In some embodiments, the term "main-connected" may also refer to devices with low incremental power cost (e.g., an incremental power cost below a threshold value), such as those devices with fully or nearly fully charged batteries, for example. In some examples, non-mains-connected relay nodes 114 may include portable (or mobile) electronic device such as a cell phone, a personal data assistant (PDA), a personal media player device, a wireless web-watch device, a personal headset device, an application specific device, and/or the like, and/or combinations thereof.

In some examples, mains-connected relay nodes 112 and/or those non-mains-connected relay nodes 114 may be adapted to send a pilot signal (not shown) to one another. Individual relay nodes 112 and/or 114 receiving such pilot signals may be configured to measure the link strength of such pilot signals (e.g., the signal strength). Individual relay nodes 112 and/or 114 may communicate information regarding what other nodes it can hear and what are the associated link strengths (e.g., connectivity information) to base stations 106. As used herein, the term "connectivity information" may include data regarding what other nodes given can hear and what are the associated link strengths.

Individual base stations 106 may be configured to instruct those mains-connected relay nodes 112 and/or those non-mains-connected relay nodes 114 with stronger link strength to route communication to destination node 104 while those mains-connected relay nodes 112 and/or those non-mains-connected relay nodes 114 with weaker channel strength levels may not be so instructed. In the illustrated example, the dashed arrows illustrate that mains-connected relay nodes 112 and/or non-mains-connected relay nodes 114 with stronger link strength may route communication to destination node 104.

Figure 2:
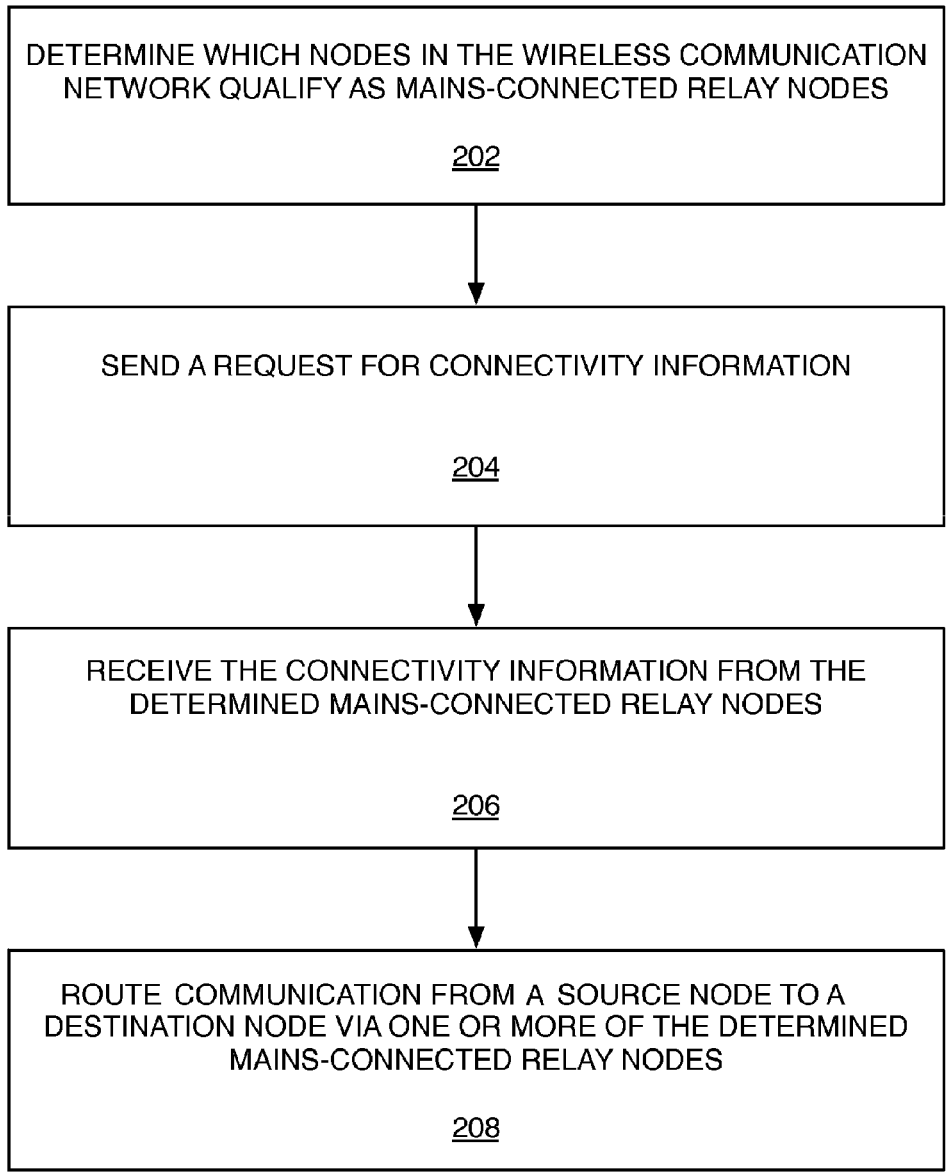
FIG. 2 illustrates an example process for routing communications in wireless communication networks via mains-connected relay nodes that is arranged in accordance with at least some embodiments of the present disclosure.

FIG. 2 illustrates an example process for routing communications in wireless communication networks via mains-connected relay nodes that may be arranged in accordance with at least some embodiments of the present disclosure. Process 200, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 2 may be practiced in various implementations. For example, although process 200, as shown in FIG. 2, may comprise one particular order of blocks or actions, the order in which these blocks or actions are presented does not necessarily limit claimed subject matter to any particular order. Likewise, intervening actions not shown in FIG. 2 and/or additional actions not shown in FIG. 2 may be employed and/or some of the actions shown in FIG. 2 may be eliminated, without departing from the scope of claimed subject matter. Process 200 may include one or more of functional operations as indicated by example operations 202, 204, 206, and/or 208.

As illustrated, process 200 may be implemented for routing communications in wireless communication network 100 (FIG. 1) via one or more mains-connected relay nodes 112 (FIG. 1). Processing may begin at block 202, "determine which nodes in the wireless communication network qualify as mains-connected relay nodes", where the nodes in the wireless communication network that qualify as mains-connected relay nodes may be determined. For example, the determination of which nodes in the wireless communication network qualify as mains-connected relay nodes may be based at least in part on one or more criteria such as power source data, incremental power cost data, charge left data, location data, the like, or combinations thereof. In one example, a stationary location over a period of time may provide an indicium that a node may be mains-connected. In another example, a zero incremental power cost might indicate a mains-connected node, or an incremental power cost below a specified threshold value might indicate a node that may be effectively considered "mains-connected" even if on battery supply. For example, power status data may identify a node as mains-connected with an explicit flag associated with the registration information of a node, or data indicating an incremental cost as zero, or the like. As discussed above, the determined mains-connected relay nodes may include a vending machine operatively associated with a cellular data link, in one example.

Processing may continue from block 202 to block 204, "send a request for connectivity information", where a request for connectivity information may be sent to the determined mains-connected relay nodes. For example, a request for connectivity information may be sent to the determined mains-connected relay nodes based at least in part on the determination of which nodes qualify as mains-connected relay nodes. In some examples, the sending of the request for connectivity information may be performed on a periodic basis. In other examples, the sending of the request for connectivity information may be performed on an on-demand basis. Processing may continue from block 204 to block 206, "receive the connectivity information from the determined mains-connected relay nodes", where the connectivity information may be received from the determined mains-connected relay nodes.

Processing may continue from block 206 to block 208, "route communication from a source node to a destination node via one or more of the determined mains-connected relay nodes", where communication from a source node may be routed to a destination node via one or more of the determined mains-connected relay nodes. For example, communication from a source node may be routed to a destination node via one or more of the determined mains-connected relay nodes based at least in part on the connectivity information from the determined mains-connected relay nodes. In some examples, the routing of the communication from the source node to the destination node via one or more of the determined mains-connected relay nodes may include the following: determining a relay path among one or more of the determined mains-connected relay nodes and/or assigning one or more of the determined mains-connected relay nodes as relay helpers based at least in part on the determined relay path.

In operation, each time a relay may be established there may be a step of querying potential participants for connectivity information (e.g., as might be used to build a table of connectivities). Unfortunately, such querying can burn a lot of power for non-mains-connected relay nodes, and the power costs may increase with the square of participant count. A device in a wireless communication network with many participants who have marginal connections may wind up burning substantial power just testing possible links and computing linkage scores. Process 200 addressed such issues by leveraging mains-connected relay nodes to aid in relaying. In one embodiment, process 200 may be applied at first to nodes known to be mains-connected (e.g., vending machines) and, if a suitable relay path is discovered in those mains-connected relay nodes, no further node mapping and discovery might occur.

Figure 3:
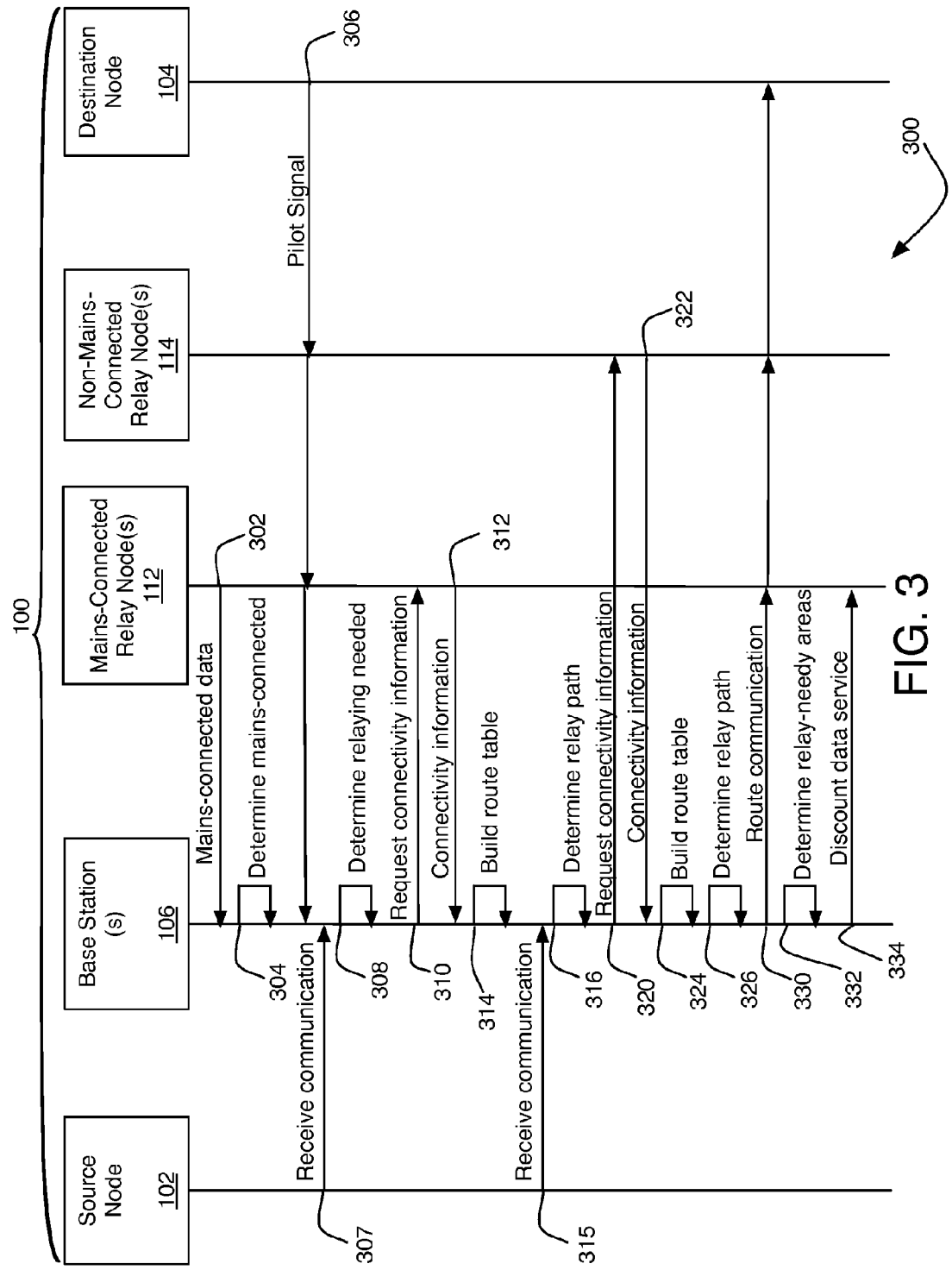
FIG. 3 illustrates another example process for routing communications in wireless communication networks via mains-connected relay nodes that is arranged in accordance with at least some embodiments of the present disclosure.

FIG. 3 illustrates another example process for routing communications in wireless communication networks via mains-connected relay nodes that is arranged in accordance with at least some embodiments of the present disclosure. Process 300 may include one or more of operations as illustrated by operations 302, 304, 306, 307, 308, 310, 312, 314, 315, 316, 320, 322, 324, 326, 330, 332 and/or 334.

Process 300 may provide one or more examples of implementations of process 200 of FIG. 2. As illustrated, process 300 may be implemented for routing communications in wireless communication network 100 via mains-connected relay nodes 112. Processing may begin at operation 302, "mains-connected data", where data providing indicia that a node may be mains-connected may be communicated from mains-connected relay nodes 112 to base station 106. For example, such mains-connected data may include one or more indicium such as power source data, incremental power cost data, location data, the like, or combinations thereof.

Processing may continue from operation 302 to operation 304 "determine mains-connected", where the nodes in the wireless communication network that qualify as mains-connected relay nodes may be determined. For example, the determination of which nodes in the wireless communication network qualify as mains-connected relay nodes may be based at least in part on one or more criteria such as power source data, incremental power cost data, location data, the like, or combinations thereof. In one example, a stationary location over a period of time may provide an indicium that a node may be mains-connected. In another example, a zero incremental power cost might indicate a mains-connected node, or an incremental power cost below a specified threshold value might indicate a node that may be effectively considered "mains-connected" even if on battery supply. As discussed above, the determined mains-connected relay nodes may include a vending machine operatively associated with a cellular data link, in one example.

Processing may continue from operation 304 to operation 306 "pilot signal", where a pilot signal may be received via base station 106. For example, a pilot signal from destination node 104 may be received via base station 106. In some examples, such a pilot signal may also be received by mains-connected relay nodes 112 and/or non-mains-connected relay nodes 114. For example, the base station may set a prescheduled beacon schedule that be utilized for nodes, including destination node 104, to take turns sending out a pilot signal. In other examples, the base station may send specific queries ordering nodes, such as destination node 104, to send out a pilot signal. As described in greater detail below, such pilot signals may be utilized to measure the signal strength of the pilot signals from destination node 104.

Processing may continue from operation 306 to operation 307 "receive communication", where communication from source node 102 may be made received by base station 106. In the example illustrated, the operation 307 to receive communication from source node 102 may occur prior to (e.g. as an on-demand trigger) to operation 308.

Processing may continue from operation 307 to operation 308 "determine relaying needed", where a determination may be made as to whether relaying is needed. For example, determination may be made as to whether relaying is needed to communicate with the destination node 104 based at least in part on a link strength with destination node 104. For example, a link strength associated with destination node 104 may be based at least in part on the pilot signal of operation 306. Base station 106 may be configured to measure the signal strength of the pilot signals from destination node 104. Based at least in part on the signal strength of the pilot signals, the base station 106 may compute a reliability metric that may indicate the link strength associated with destination node 104.

Relaying policies may be used by base station 106 to decide if relaying is needed. Such relaying policies may be based on projected capacity gains, link strength to individuals, the like, or combinations thereof. In one example, a simple trigger may be used by base station 106 to decide if relaying is needed. For example, a link strength below a threshold value may trigger a determination that relaying is needed. Additionally or alternatively, an optimization of projected capacity gains may be used to decide if relaying is needed. For example, in a congested system, optimization of projected capacity gains may be used to compare a direct link with one or more relaying options. Such an optimization of projected capacity gains may be utilized to determine that a direct link with poor link strength may take more bandwidth than the bandwidth associated with using a relay of multiple links that have better link strengths. Such an optimization of projected capacity gains may occur after or before the building of a route table, as is described in greater detail below with regard to operation 314. For example, such an optimization of projected capacity gains may utilize data from the pilot signal associated with operation 306 to determine whether relaying is likely to be gainful, and a further comparison may be done after building the route table to confirm whether relaying is likely to be gainful. In another example, such an optimization of projected capacity gains may occur after the building of a route table to determine whether relaying is likely to be gainful.

Processing may continue from block 308 to operation 310, "request connectivity information", where a request for connectivity information may be sent to the determined mains-connected relay nodes 112. For example, a request for connectivity information may be sent to mains-connected relay nodes 112 based at least in part on the determination of which nodes qualify as mains-connected relay nodes made at operation 304. Such connectivity information may include data regarding what other nodes an individual mains-connected relay node 112 can hear and what are the associated link strengths.

For example, base station 106 may set a prescheduled beacon schedule that may be utilized for nodes (e.g., mains-connected relay nodes 112, non-mains-connected relay nodes 114, etc.) to take turns sending out a pilot signal. In such an example, the operation 308 to determine if relaying is needed may occur after operations 310 or 312, or the operation 308 to determine if relaying is needed may be eliminated from process 300. For example, the sending of the request for connectivity information may be performed on a periodic basis.

In other examples, base station 106 may send queries ordering nodes to send out a pilot signal. In such examples, the sending of the request for connectivity information may be performed on an on-demand basis (e.g., initiated based at least in part on the determination of whether relaying is needed to communicate with the destination node). For example, the sending of the request for connectivity information to mains-connected relay nodes 112 may be initiated based at least in part on projected capacity gains, link strength or the like.

Processing may continue from block 310 to operation 312, "connectivity information", where the connectivity information may be received from mains-connected relay nodes 112. For example, individual mains-connected relay nodes 112 may communicate connectivity information regarding what other nodes the individual mains-connected relay nodes 112 can hear and what are the associated link strengths (e.g., connectivity information) to base station 106. Mains-connected relay node 112 receiving pilot signals may be configured to measure the link strength (e.g., the signal strength) based at least in part on such pilot signals to form such connectivity information, for example. In addition or in the alternative to link strength, such connectivity information may include relative marginal power costs of spending more power, a monetary cost (e.g., a set price associated with utilizing a given node as a relay), the like, or combinations thereof.

Processing may continue from operation 312 to operation 314 "build route table", where a route table may be built. For example, a route table may be built by base station 106 based at least in part on the connectivity information from the mains-connected relay nodes 112. For example, base station 106 may build such a route table through matrix analysis. Such a matrix may be built utilizing the link strengths to populate the cells, where each cell may be associated with two nodes of the wireless communication system. As two nodes are likely to report on the same link, the weakest (or strongest) reported link strength may be chosen to populate the cells of such matrices. In embodiments utilizing additional connectivity information categories (e.g., relative marginal power costs and/or monetary cost), an additional matrix may be utilized for each additional connectivity information category utilized. Alternatively, such additional connectivity information categories may be associated as orthogonal numbers at each coordinate point of the matrix.

As an alternative to operation 307, processing may continue from operation 314 to operation 315 "receive communication", where communication from source node 102 may be made received by base station 106. In such an alternative, process 300 may operate to routinely build route table 314 (e.g. even in the absence of communication 307). In such an example, operation 308 may optionally be removed from process 300. Such routine building of route table 314 may involve requesting connectivity information from the mains-connected relay nodes 112; however, such requests may not adversely impact the power supply of such mains-connected relay nodes 112 as might not be the case with non-mains-connected relay nodes 114. In such an alternative, the operation 315 to receive communication from source node 102 may occur prior to (e.g. as an on-demand trigger) to operation 316.

Processing may continue from operation 314 or operation 315 to operation 316 "determine relay path", where a relay path may be determined among one or more of the mains-connected relay nodes 112 based at least in part on the route table. For example, a Connectivity Selection Algorithm (CSA) may be utilized to determine a relay path among one or more of the mains-connected relay nodes 112 based at least in part on the route table. As used herein, the term "CSA" may refer to any number of algorithms capable of finding the lowest total weakness (or highest strength) between a source node and a destination node. For example, a minimum spanning tree may be utilized to find the least amount of sum metrics associated with potential relay routes. Alternatively, a traverse function may be utilized to output a link map based on the route table. In embodiments utilizing additional connectivity information categories (e.g., relative marginal power costs and/or monetary cost), such CSAs may involve a multi-dimensional analysis. For example, a multi-dimensional CSA analysis might have a predetermined rule that specifies finding the strongest relay connection where no individual link has a link strength below a specified threshold value and where no individual link has a cost above a specified threshold value.

In some examples, process 300 may include an operation (not illustrated) to determine the determined relay path from operation 316 is capable of reaching the destination node 104. For example, such a determination may show that relaying exclusively through mains-connected relay nodes 112 may be insufficient to communicate with destination node 104, which might trigger route discovery associated with non-mains-connected relay nodes 114 via operations 320, 322, 324, and 326. In some cases, relaying may be completely accomplished through mains-connected relay nodes 112, and operations 320, 322, 324, and 326 may be skipped. In other cases, relaying may be only partially accomplished through mains-connected relay nodes 112, and operations 320, 322, 324, and 326 may be initiated after route discovery associated with mains-connected relay nodes 112 has already been conducted. In either case, battery power associated with non-mains-connected relay nodes 114 may be conserved by limiting or decreasing the involvement of non-mains-connected relay nodes 114 with route discovery and/or routing of communications.

Operations 320, 322, 324, and 326 may implement similar procedures as compared with operations 310, 312, 314, and 316, respectively. However, as illustrated, operations 320, 322, 324, and 326 may be conducted with respect to non-mains-connected relay nodes 114, in addition to mains-connected relay nodes 112. For example, the operation 320 "request connectivity information", operation 322 "connectivity information", operation 324 "build route table", and/or operation 326 "determine relay path", may be conducted at least with respect to non-mains-connected relay nodes 114 (and potentially including mains-connected relay nodes 112). For example, the route table and relay path of operations 324 and 326 may be built using incremental information gathering by including a superset of connectivity information associated with operations 112 and/or 322. In one example, operation 320 "request connectivity information" may include sending a request for connectivity information to non-mains-connected relay nodes 114 based at least in part on the determination of whether the determined relay path of operation 116 is capable of reaching the destination node 104. In one example, such route discovery (e.g., querying non-mains-connected relay nodes 114) may be limited to only those links that were needed for relaying but not included in the initial route table from operation 114. Operation 322 "connectivity information" may include receiving connectivity information from the non-mains-connected relay nodes 114. Operation 324 "build route table" and/or operation 326 "determine relay path" may be utilized in determining a relay path that may be utilized in routing communication from source node 102 to destination node 104 via one or more of the non-mains-connected relay nodes 114 and/or one or more of the determined mains-connected relay nodes 112 based at least in part on the connectivity information from non-mains-connected relay nodes 114.

Processing may continue from operation 316 or operation 326 to operation 330, "route communication", where communication from source node 102 may be routed to destination node 104 via one or more of the determined mains-connected relay nodes 112 and/or non-mains-connected relay nodes 114. For example, communication may be routed based at least in part on the connectivity information from mains-connected relay nodes 112 and/or non-mains-connected relay nodes 114. In some examples, the routing of communication may include assigning one or more of mains-connected relay nodes 112 and/or non-mains-connected relay nodes 114 as relay helpers based at least in part on the relay path determined at operation 316 or operation 326. For example, base station 106 may sends out instructions to nodes involved in routing the communication (e.g., mains-connected relay nodes 112 and/or non-mains-connected relay nodes 114, and potentially destination node 104) informing these nodes of their respective relaying responsibilities in relaying the forthcoming communication between base station 106 and destination node 104.

Additionally, in some examples, wireless communication network 100 may provide some level of discounted (or some level of free) data service to mains-connected relay nodes 112. In one example, process 300 (or a separate process) may include operation 332, "determine relay-needy areas", where wireless communication network 100 may determine the geographic distribution of such mains-connected relay nodes 112 and/or may determine areas of wireless communication network 100 that are relay-needy (e.g., areas that have a low ratio of mains-connected relay nodes 112 compared with relaying need). Processing may continue from operation 332 to operation 334, "discount data service", where wireless communication network 100 may provide such discounted data service to mains-connected relay nodes 112 based at least in part on the geographic distribution of mains-connected relay nodes 112 and/or the determined relay-needy areas of wireless communication network 100. For example, wireless communication network 100 may determine that free data service may be designated for such relay-needy areas to reward and/or induce location of mains-connected relay nodes 112 in such relay-needy areas.

In operation, process 300 may reduce power costs associated with route discovery for many networks, and may provide a relay scenario where battery powered mobile users may not even need to be involved in relaying. For example, the process of querying nodes may often be as power intensive as initiating phone calls. Additionally, as nodes may be mobile, a route table may need to be reconstructed with some frequency (e.g., every few minutes). As a result, battery time associated with a node subject to frequent route table reconstruction might be much closer to talk time instead of standby time.

As discussed above, the request for connectivity information to build a table of possible relay connections may initially query only mains-connected relay nodes 112 and build initial route tables using only mains-connected relay nodes 112 and nodes (e.g. destination node 104) needing relay help, followed possibly by incremental route discovery. For example, information gathered in operations 312 and/or 314 may still be used in operations 322 and/or 324 to reduce the amount of requests (and associated power costs) sent to non-mains-connected relay nodes 114.

This may allow for construction of relays through mains-connected devices (e.g. mains-connected relay nodes 112) without draining resources from battery powered mobile nodes (e.g. non-mains-connected relay nodes 114). Process 300 may operate to consider power cost prior to requesting connectivity information, potentially reducing the amount of querying that devices with low batteries would be subjected to. When mains-connected relay nodes 112 are available for relaying, non-mains-connected relay nodes 114 may never even have to respond to a relay routing request, potentially reducing the overall battery usage of a wireless communication network 100.

While process 200 and process 300 have been described above as primarily performing operations via base station 106, it will be appreciated that some or all of these operations may be performed by one or more of the mains-connected relay nodes 112 and/or non-mains-connected relay nodes 114.

FIG. 4 illustrates an example computer program product 400 that is arranged in accordance with at least some examples of the present disclosure. Program product 400 may include a signal bearing medium 402. Signal bearing medium 402 may include one or more machine-readable instructions 404, which, if executed by one or more processors, may operatively enable a computing device to provide the functionality described above with respect to FIG. 2 and/or FIG. 3. Thus, for example, referring to the system of FIG. 1 one or more base stations 106 may undertake one or more of the actions shown in FIG. 2 and/or FIG. 3 in response to instructions 404 conveyed by medium 402.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass communications medium 410, such as, but not limited to, a digital and/or an analog communication medium (e.g., a fiber optic cable, a waveguide, a wired communications link, a wireless communication link, etc.).

Figure 5:
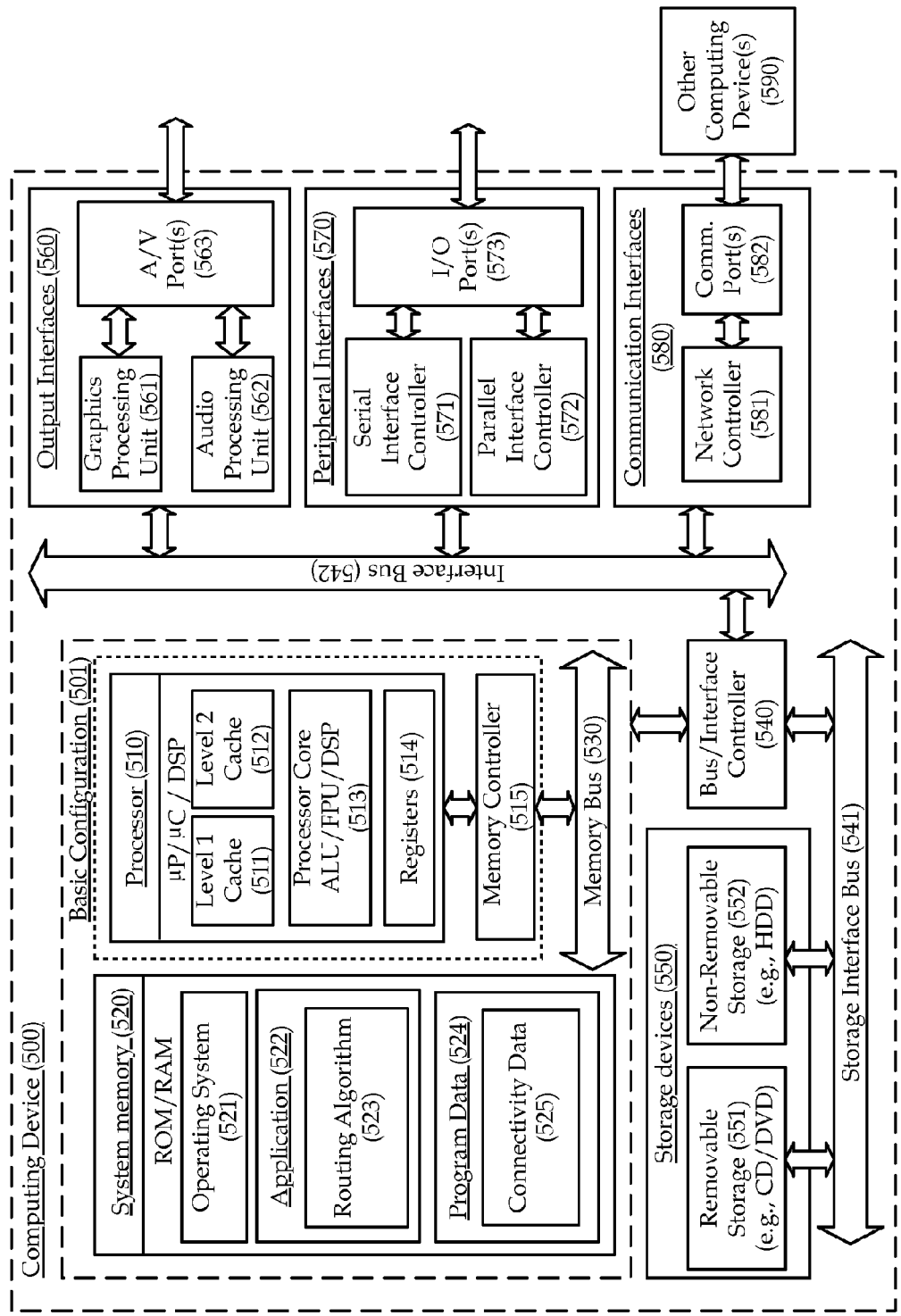
FIG. 5 is a block diagram of an illustrative embodiment of a computing device arranged in accordance with at least some embodiments of the present disclosure.

FIG. 5 is a block diagram illustrating an example computing device 500 that is arranged in accordance with at least some embodiments of the present disclosure. In one example configuration 501, computing device 500 may include one or more processors 510 and system memory 520. A memory bus 530 may be used for communicating between the processor 510 and the system memory 520.

Depending on the desired configuration, processor 510 may be of any type including but not limited to a microprocessor (μP), a microcontroller (μC), a digital signal processor (DSP), or any combination thereof. Processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include a routing algorithm 523 in a wireless communication network that is arranged to perform the functions as described herein including the functional blocks and/or actions described with respect to process 200 of FIG. 2 and/or process 300 of FIG. 3. Program Data 524 may include connectivity data 525 for use with routing algorithm 523, for example, data corresponding to link strength or the like. In some example embodiments, application 522 may be arranged to operate with program data 524 on an operating system 521 such that implementations of routing communications in wireless communication networks via mains-connected relay nodes may be provided as described herein. For example, base station 106 may comprise all or a portion of computing device 500 and be capable of performing all or a portion of application 522 such that implementations of routing communications in wireless communication networks via mains-connected relay nodes may be provided as described herein. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more NV ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 590 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method implemented in a base station of a wireless communication network, comprising:
   determining which nodes in the wireless communication network qualify as mains-connected relay nodes;
   sending a request for connectivity information to the determined mains-connected relay nodes based at least in part on the determination of which nodes qualify as mains-connected relay nodes;
   receiving the connectivity information from the determined mains-connected relay nodes;
   providing discounted data service to one or more of the determined mains-connected relay nodes based at least in part on the geographic distribution of the determined mains-connected relay nodes and/or on a determined relay-needy area of the wireless communication network; and
   routing communication from a source node to a destination node via one or more of the determined mains-connected relay nodes based at least in part on the connectivity information from the determined mains-connected relay nodes.

2. The method of claim 1, wherein the determination of which nodes in the wireless communication network qualify as mains-connected relay nodes is based at least in part on one or more of power source data, incremental power cost data, or location data.

3. The method of claim 1, wherein the sending of the request for connectivity information is performed on a periodic basis.

4. The method of claim 1, wherein the sending of the request for connectivity information is performed on an on-demand basis.

5. The method of claim 1, wherein the routing of the communication from the source node to the destination node via one or more of the determined mains-connected relay nodes comprises:
   determining a relay path among one or more of the determined mains-connected relay nodes; and assigning one or more of the determined mains-connected relay nodes as relay helpers based at least in part on the determined relay path.

6. The method of claim 1, further comprising:
building a route table based at least in part on the connectivity information from the determined mains-connected relay nodes,
wherein the routing of the communication from the source node to the destination node via one or more of the determined mains-connected relay nodes comprises:
determining a relay path among one or more of the determined mains-connected relay nodes based at least in part on the route table; and assigning one or more of the determined mains-connected relay nodes as relay helpers based at least in part on the determined relay path.

7. The method of claim 1, further comprising determining whether relaying is needed to communicate with the destination node based at least in part on a link strength with the destination node, wherein the sending of the request for connectivity information to the determined mains-connected relay nodes is initiated based at least in part on the determination of whether relaying is needed to communicate with the destination node.

8. The method of claim 1, further comprising determining whether relaying is needed to communicate with the destination node based at least in part on projected capacity gains of the wireless communication network, wherein the sending of the request for connectivity information to the determined mains-connected relay nodes is initiated based at least in part on the determination of whether relaying is needed to communicate with the destination node.

9. The method of claim 1, further comprising:
determining a relay path among one or more of the determined mains-connected relay nodes;
determining whether the determined relay path is capable of reaching the destination node;
sending a request for connectivity information to non-mains-connected relay nodes based at least in part on the determination of whether the determined relay path is capable of reaching the destination node;
receiving the connectivity information from the non-mains-connected relay nodes; and
routing the communication from the source node to the destination node via one or more of the non-mains-connected relay nodes and/or one or more of the determined mains-connected relay nodes based at least in part on the connectivity information from the non-mains-connected relay nodes.

10. A method implemented in a base station of a wireless communication network, comprising:
determining which nodes in the wireless communication network qualify as mains-connected relay nodes, wherein one or more of the determined mains-connected relay nodes comprise a vending machine operatively associated with a cellular data link;
sending a request for connectivity information to the determined mains-connected relay nodes based at least in part on the determination of which nodes qualify as mains-connected relay nodes;
receiving the connectivity information from the determined mains-connected relay nodes;
routing communication from a source node to a destination node via one or more of the determined mains-connected relay nodes based at least in part on the connectivity information from the determined mains-connected relay nodes; and
providing discounted data service to one or more of the determined mains-connected relay nodes based at least in part on the geographic distribution of the determined mains-connected relay nodes and/or on a determined relay-needy area of the wireless communication network.

11. A wireless communication network, comprising:
a source node configured to communicate with one or more base stations;
one or more mains-connected relay nodes configured to communicate with the one or more base stations; and
at least one of the one or more base stations configured to:
determine which nodes in the wireless communication network qualify as mains-connected relay nodes,
send a request for connectivity information to the determined mains-connected relay nodes based at least in part on the determination of which nodes qualify as mains-connected relay nodes,
receive the connectivity information from the determined mains-connected relay nodes,
provide discounted data service to one or more of the determined mains-connected relay nodes based at least in part on the geographic distribution of the determined mains-connected relay nodes and/or on a determined relay-needy area of the wireless communication network, and
route communication from the source node to a destination node via one or more of the determined mains-connected relay nodes based at least in part on the connectivity information from the determined mains-connected relay nodes.

12. The wireless communication network of claim 11, wherein the determination of which nodes in the wireless communication network qualify as mains-connected relay nodes is based at least in part on one or more of power source data, incremental power cost data, or location data.

13. The wireless communication network of claim 11, wherein the at least one of the one or more base stations is further configured to:
build a route table based at least in part on the connectivity information from the determined mains-connected relay nodes,
wherein the routing of the communication from the source node to the destination node via one or more of the determined mains-connected relay nodes comprises:
determining a relay path among one or more of the determined mains-connected relay nodes based at least in part on the route table; and
assigning one or more of the determined mains-connected relay nodes as relay helpers based at least in part on the determined relay path.

14. The wireless communication network of claim 11, wherein the at least one of the one or more base stations is further configured to determine whether relaying is needed to communicate with the destination node, wherein the sending of the request for connectivity information to the determined mains-connected relay nodes is initiated based at least in part on the determination of whether relaying is needed to communicate with the destination node.

15. The wireless communication network of claim 11, wherein the at least one of the one or more base stations is further configured to:
determine a relay path among one or more of the determined mains-connected relay nodes;
determine whether the determined relay path is capable of reaching the destination node;

send a request for connectivity information to non-mains-connected relay nodes based at least in part on the determination of whether the determined relay path is capable of reaching the destination node;
receive the connectivity information from the non-mains-connected relay nodes; and
route the communication from the source node to the destination node via one or more of the non-mains-connected relay nodes and/or one or more of the determined mains-connected relay nodes based at least in part on the connectivity information from the non-mains-connected relay nodes.

16. An article for use with a base station of a wireless communication network, comprising:
a non-transitory signal bearing medium comprising machine-readable instructions stored thereon, which, if executed by one or more processors, operatively enable a computing device to:
determine which nodes in the wireless communication network qualify as mains-connected relay nodes,
send a request for connectivity information to the determined mains-connected relay nodes based at least in part on the determination of which nodes qualify as mains-connected relay nodes,
receive the connectivity information from the determined mains-connected relay nodes,
provide discounted data service to one or more of the determined mains-connected relay nodes based at least in part on the geographic distribution of the determined mains-connected relay nodes and/or on a determined relay-needy area of the wireless communication network, and
route communication from the source node to a destination node via one or more of the determined mains-connected relay nodes based at least in part on the connectivity information from the determined mains-connected relay nodes.

17. The article of claim 16, wherein the determination of which nodes in the wireless communication network qualify as mains-connected relay nodes is based at least in part on one or more of power source data, incremental power cost data, or location data.

18. The article of claim 16, further operatively enabling the computing device to:
build a route table based at least in part on the connectivity information from the determined mains-connected relay nodes,
wherein the routing of the communication from the source node to the destination node via one or more of the determined mains-connected relay nodes comprises:
determine a relay path among one or more of the determined mains-connected relay nodes based at least in part on the route table; and assign one or more of the determined mains-connected relay nodes as relay helpers based at least in part on the determined relay path.

19. The article of claim 16, further operatively enabling the computing device to:
determine a relay path among one or more of the determined mains-connected relay nodes;
determine whether the determined relay path is capable of reaching the destination node;
send a request for connectivity information to non-mains-connected relay nodes based at least in part on the determination of whether the determined relay path is capable of reaching the destination node;
receive the connectivity information from the non-mains-connected relay nodes; and
route the communication from the source node to the destination node via one or more of the non-mains-connected relay nodes and/or one or more of the determined mains-connected relay nodes based at least in part on the connectivity information from the non-mains-connected relay nodes.

* * * * *